May 8, 1956 W. F. JEHN 2,744,700
ACTUATING MECHANISM AND PARACHUTE DELIVERY APPARATUS
Filed Sept. 17, 1954 2 Sheets-Sheet 1

INVENTOR.
WERNER F. JEHN
BY Lloyd B. Stevens, Jr.
Wade Koontz AND
ATTORNEYS

May 8, 1956  W. F. JEHN  2,744,700
ACTUATING MECHANISM AND PARACHUTE DELIVERY APPARATUS
Filed Sept. 17, 1954  2 Sheets-Sheet 2
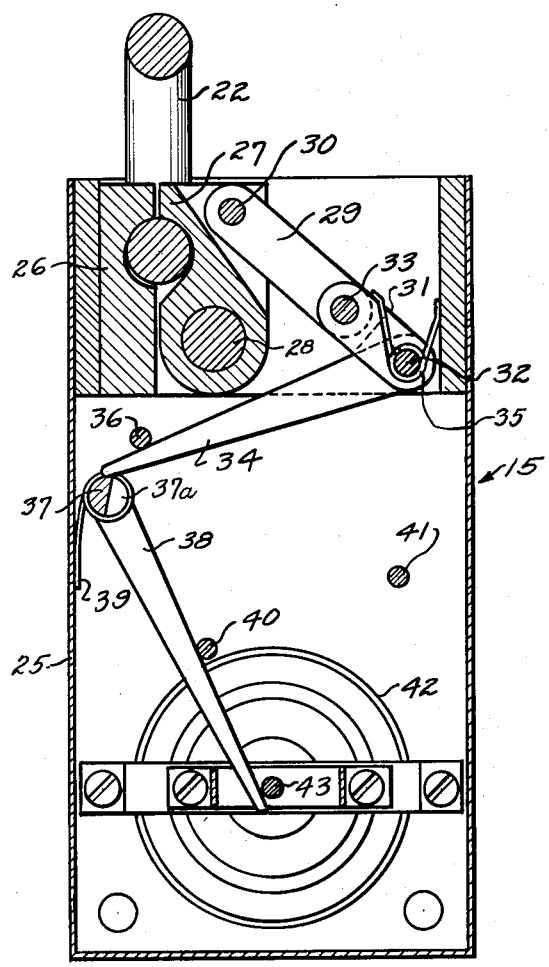
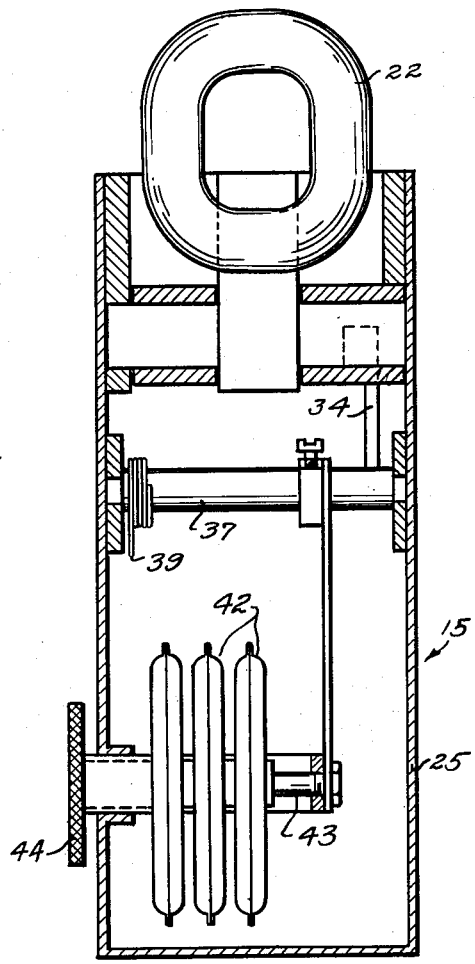
INVENTOR.
WERNER F. JEHN
BY Lloyd B. Stevens, Jr.
AND
Wade Koontz
ATTORNEYS United States Patent Office 2,744,700
Patented May 8, 1956

2,744,700

ACTUATING MECHANISM AND PARACHUTE DELIVERY APPARATUS

Werner F. Jehn, Dayton, Ohio

Application September 17, 1954, Serial No. 456,893

7 Claims. (Cl. 244—150)

(Granted under Title 35, U. S. Code (1952), sec. 266)

The invention described herein may be manufactured and used by or for the United States Government for governmental purposes without payment to me of any royalty thereon.

This invention relates to a parachute cargo package and particularly to an automatic release mechanism. More particularly this invention relates to a mechanism for releasing a parachute at a selected altitude.

A number of different types of apparatus are known for releasing a parachute at a selected altitude, and some of these apparatus are actuated by pressure responsive bellows similar in action to an aneroid barometer. Most of these apparatus are quite complex, some of them using electrical and explosive means or piston-type means in conjunction with the bellows actuation.

It is an object of this invention to provide a parachute cargo apparatus which does not drift to any extent in its descent and which falls rapidly during the major portion of its descent to aid in avoiding antiaircraft fire. It is another object of this invention to provide a parachute release apparatus for use by personnel wherein the main parachute will open at a preselected altitude and the individuals using these parachutes will land without substantial drift and will fall rapidly during most of the descent to avoid antiaircraft fire. It is a further object of this invention to provide an automatic release means for actuating or releasing any type of apparatus at a preset altitude. Still another object of this invention is to provide an automatic parachute release mechanism which is simple in construction and foolproof in operation. It is a particular object of this invention to provide an automatic release mechanism which is usable on parachutes and which contains a bellows actuating mechanism associated with levers, springs, a pilot parachute, etc. to give a positive release of the main parachute at a preset altitude. These and other objects of my invention will be apparent from the following detailed description of the invention and the claims taken in conjunction with the accompanying drawings.

Broadly my invention involves a release or actuating mechanism which will automatically operate when a preset altitude is reached. The primary actuating means of my invention is a pressure responsive bellows similar in operation to an aneroid barometer. This bellows operates in conjunction with lever and spring arrangements and can operate with a pilot parachute to release a main parachute at a preselected altitude. My invention also includes this release mechanism incorporated in a parachute cargo package.

A preferred embodiment of my invention is described below.

Figure 2 is a sectional front elevation view of my automatic release mechanism.

Figure 3 is a sectional side elevation view of my automatic release mechanism.

Figure 1:
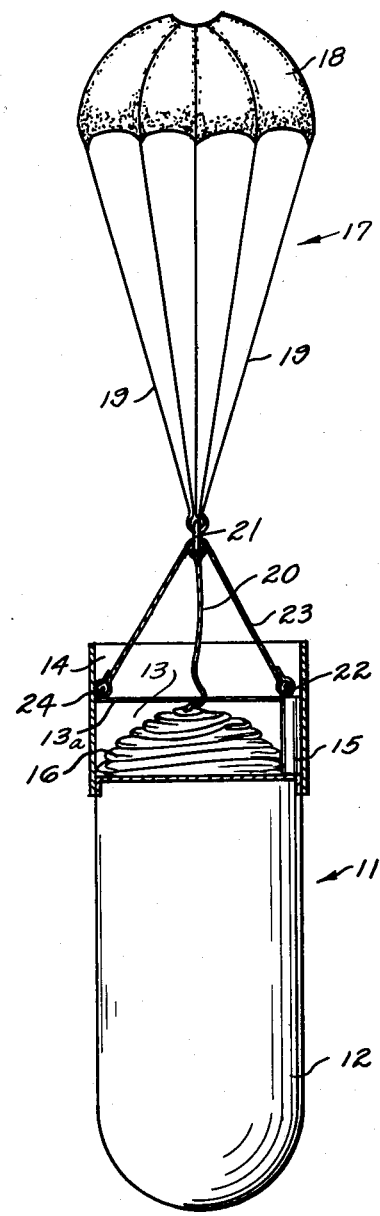
Figure 1 is an elevation view in partial section of a parachute cargo package incorporating my release mechanism.

Figure 1 shows a complete parachute cargo package including a pilot parachute, main parachute, and the parachute release mechanism. Parachute cargo package 11 contains cargo section 12, main parachute section 13, pilot parachute section 14, and release mechanism 15. The main and pilot parachute sections are separated by removable divider 13a. Main parachute 16 is shown contained within its compartment 13, and pilot parachute 17 is shown in its inflated condition with parachute cargo package 11 suspended from it. Pilot parachute 17 is shown having canopy 18 and parachute lines 19 which are attached to ring 21. Cord 23, which may be made of fabric, plastic, metal, or other suitable material, is attached to cargo package 11 at point 24, and cord 23 passes through ring 21 and is attached at its other end to link 22, which is attached to release mechanism 15. Line 20 is attached to the canopy of main parachute 16 and is also attached to ring 21.

For a detailed discussion of the release mechanism reference should be made to Figures 2 and 3. Release mechanism 15 has as its base frame 25.

Link 22 is shown contained within jaw 26 which is rigidly attached to frame 25 and movable jaw 27 which is rotatably attached to frame 25 by pin 28. Arm 29 is rotatably attached to movable jaw 27 by pin 30. Arm 31 is rotatably attached to frame 25 by pin 32. Arm 29 and arm 31 are joined by pin 33 to form a toggle-type linkage. Lever 34 is rigidly attached to arm 31 at a point near the attachment of arm 31 to frame 25. Spring 35 is attached to pin 32 in such a fashion as to tend to cause arm 31 to rotate in a counterclockwise direction and to tend to cause the toggle-type linkage to break. Lever 34 is restrained from rotating in a clockwise direction by pin 36 and it is restrained from rotating in a counterclockwise direction by shaft 37. Lever 34 is associated at its free end with shaft 37, which has a milled-out portion 37a near its point of association with the free end of lever 34. Spring 39 tends to cause shaft 37 to rotate in a counterclockwise direction. Lever 38 is rigidly attached to shaft 37 and is restrained from rotating in a counterclockwise direction by key 40 which is a removable pin. Arm 38 is further restrained from rotating in a counterclockwise direction by rod 43 at altitudes above the preset altitude of the apparatus. Rod 43 is rigidly attached to a bellows mechanism 42 which is similar in operation to an aneroid barometer in that it is pressure responsive. Knob 44 is used for the purpose of setting bellows 42 for operation at the desired altitude, and knob 44 has altitude calibrations on it. Pin 41 restricts the counterclockwise movement of lever 38 after it has moved a sufficient distance during the operation of the apparatus to allow main parachute 16 to be released.

My invention operates in the following manner: After the plane is aloft and above the altitude at which the apparatus is set to operate parachute cargo package 11 is dropped. Previously the preset altitude at which it is desired that the apparatus operate has been set by knob 44. When parachute cargo package 11 is dropped from the airplane pilot parachute 17 is released, since its ripcord was attached to the airplane, and key 40 is pulled since it also was attached to the airplane. Alternatively the ripcord of pilot parachute 17 may be manually pulled as the cargo package is dropped and key 40 may be manually removed when the apparatus is above the preset altitude. Cargo package 11 will now be in the condition shown in Figure 1. Parachute cargo package 11 will fall almost vertically and very rapidly since it is slowed in falling only by the small pilot parachute 17. When the preset altitude is reached, say 1,000 feet, the increased pressure on the outside of bellows 42 causes it to be compressed to such an extent that rod 43 has been withdrawn so it no longer prevents lever 38 from rotating in a counterclockwise direction. Spring 39 then operates to cause lever 38 and shaft 37 to rotate in a counterclockwise direction. This rotating of shaft 37 brings the milled-out portion 37a of shaft 37 into contact with the free end of lever 34. Lever 34 is then no longer restricted from rotating in a counterclockwise direction and is caused to so rotate by spring 35 The result of rotation of lever 34 is that arm 31 to which lever 34 is rigidly attached is caused to rotate in a counterclockwise direction, the toggle linkage is broken, movable jaw 27 is caused to rotate in a clockwise direction, and link 22 is released. Link 22 and cord 23 feed through ring 21 and pilot parachute 17 is separated from parachute cargo package 11. Pilot parachute 17 in separating from parachute cargo package 11 pulls line 20 which pulls out removable divider 13a and release main parachute 16. The cargo package now begins its normal descent under the suspension of main parachute 16.

It is obvious that certain changes and modifications may be resorted to from time to time, by persons skilled in the art, without departing from the spirit of the invention or the scope of appended claims.

I claim:

1. An automatic release mechanism comprising a frame, a jaw attached to said frame, a movable jaw rotatably attached to said frame, said jaw and said movable jaw being capable of cooperation to retain a link, a first arm rotatably connected to said movable jaw, a second arm rotatably connected to said frame, said first arm being rotatably connected to said second arm to form a toggle-type linkage, a first spring so associated with said toggle linkage as to tend to cause said linkage to break, a first lever attached to said second arm in such a manner that it rotates with said second arm, a shaft rotatably attached to said frame and having a milled-out portion, the free-end of said first lever being so associated with said shaft that said first lever is restricted in its movement by said shaft except when the free-end of said first lever is associated with the milled-out portion of said shaft, a second spring associated with said shaft in such a manner that said shaft tends to rotate, a second lever connected to said shaft in such a manner that it rotates with said shaft, a pressure responsive bellows attached to said frame, a rod attached to said bellows, and said second lever being so associated with said rod that said second lever is restricted in its movement by said rod except when said bellows is subjected to a pressure equal to or greater than the set pressure.

2. The mechanism of claim 6 wherein a removable key is so associated with said mechanism that said mechanism is rendered inoperable until said key is removed.

3. In a parachute cargo package having a cargo section, a main parachute section, a pilot parachute section, a parachute release mechanism, said parachute release mechanism comprising a frame, a jaw attached to said frame, a movable jaw rotatably attached to said frame, said jaw and said movable jaw being capable of cooperation to retain a link, a first arm rotatably connected to said movable jaw, a second arm rotatably connected to said frame, said first arm being rotatably connected to said second arm to form a toggle-type linkage, a first spring so associated with said toggle linkage as to tend to cause said linkage to break, a first lever attached to said second arm in such a manner that it rotates with said second arm, a shaft rotatably attached to said frame and having a milled-out portion, the free-end of said first lever being so associated with said shaft that said first lever is restricted in its movement by said shaft except when the free-end of said first lever is associated with the milled-out portion of said shaft, a second spring associated with said shaft in such a manner that said shaft tends to rotate, a second lever connected to said shaft in such a manner that it rotates with said shaft, a pressure responsive bellows attached to said frame, a rod attached to said bellows, means to adjust the pressure setting of said bellows, and said second lever being so associated with said rod that said second lever is restricted in its movement by said rod except when said bellows is subjected to a pressure equal to or greater than the set pressure.

4. The parachute cargo package of claim 7 wherein a removable key is so associated with said second lever that said second lever is restricted in its movement until said key is removed.

5. The parachute cargo package of claim 4 wherein a main parachute is contained in said main parachute section, a pilot parachute is contained in said pilot parachute section, a ring joins the free-ends of the lines of said pilot parachute, a link is retained by said jaws, a cord is attached to said link, said cord passing through said ring and being attached at its other end to said package, and said main parachute is attached to said ring.

6. The mechanism of claim 1 wherein a pin is associated with said first lever to prevent rotation of said first lever in a direction away from said shaft.

7. The parachute cargo package of claim 3 wherein a pin is associated with said first lever to prevent rotation of said first lever in a direction away from said shaft.

References Cited in the file of this patent

UNITED STATES PATENTS

| | | |
|---|---|---|
| 1,709,264 | Holt | Apr. 16, 1929 |
| 2,584,164 | Stallan | Feb. 5, 1952 |

FOREIGN PATENTS

| | | |
|---|---|---|
| 378,146 | Italy | Jan. 23, 1940 |
| 563,059 | Great Britain | July 27, 1944 |
| 796,264 | France | Jan. 22, 1936 |